United States Patent [19]

Haas et al.

[11] Patent Number: 4,540,626
[45] Date of Patent: Sep. 10, 1985

[54] POLYHYDROXYALKYL POLYCARBONAMIDES FOR THE PRODUCTION OF FLAME-RESISTANT POLYURETHANE RIGID FOAMS AND INTEGRAL FOAMS

[75] Inventors: Peter Haas, Haan; Geza Avar; Hartwig Grammes, both of Leverkusen, all of Fed. Rep. of Germany

[73] Assignee: Bayer AG, Leverkusen, Fed. Rep. of Germany

[21] Appl. No.: 645,205

[22] Filed: Aug. 29, 1984

[30] Foreign Application Priority Data

Sep. 10, 1983 [DE] Fed. Rep. of Germany ....... 3332792

[51] Int. Cl.³ .................... C08G 18/14; B32B 29/00
[52] U.S. Cl. .................... 428/318.8; 521/51; 521/128; 521/167; 521/118; 528/78; 528/58
[58] Field of Search .................... 521/51, 128, 167; 428/318.8; 528/78

[56] References Cited

U.S. PATENT DOCUMENTS

| | | | |
|---|---|---|---|
| 3,697,458 | 10/1972 | Burba et al. | 260/2.5 AQ |
| 3,699,078 | 10/1972 | Castro | 521/167 |
| 3,734,871 | 5/1973 | Burba et al. | 260/2.5 AQ |
| 4,100,116 | 7/1978 | Mazanek et al. | 521/167 |
| 4,246,364 | 1/1981 | Koehler et al. | 521/167 |
| 4,493,909 | 1/1985 | Haas et al. | 521/118 |

FOREIGN PATENT DOCUMENTS 852272 9/1970 Canada .................... 528/78

*Primary Examiner*—Herbert S. Cockeram
*Attorney, Agent, or Firm*—Gene Harsh; Joseph C. Gil

[57] ABSTRACT

The invention relates to the use of poly-N,N-di-(hydroxyalkyl)-polycarbonamides of aliphatic or cycloaliphatic polycarboxylic acids as reactive flame-retardants for polyurethane foams, and in particular polyurethane integral skin foams and polyurethane rigid foams which are produced with the aid of organic blowing agents. These reactive flame-retardants are added in quantities of from 11.5 to 50 parts by weight, and most preferably from 12 to 25 parts by weight, based on 100 parts of the relatively high molecular weight polyol used for the preparation of the foam. The integral skin or rigid foams produced are flame-resistant and because of their reduced flammability are capable of passing various regulation fire tests, and in particular those testing foams for use in vehicles for transport.

12 Claims, No Drawings

POLYHYDROXYALKYL POLYCARBONAMIDES FOR THE PRODUCTION OF FLAME-RESISTANT POLYURETHANE RIGID FOAMS AND INTEGRAL FOAMS

BACKGROUND OF THE INVENTION

If polyurethane foams are to be used for certain purposes, it is essential for them to have high fire resistance. This resistance is measured in various tests for flammability which may vary according to the particular purpose for which the material is to be used and may in many cases be particularly directed towards certain specific end uses. The MVSS-302 Test, the Federal German Railway Test, the Lufthansa Test (FAR 25 853) and the Small Burner Test according to DIN 53 438 can be viewed in this light.

Questions concerning the use of polyurethanes to meet special fire requirements have been studied with the greatest care, as is evident from the copious literature and many publications on this subject.

Of particular interest are the esters of acids containing phosphorus and the derivatives of these acids as well as halogen compounds and in particular compounds of bromine. The most important flame-retardants to be mentioned in this connection are trichloroethylphosphate and its higher homologues, tricresylphosphate, derivatives of aminomethylphosphonic acid ester, tris-(2,3-dibromopropyl) phosphate, and butene- and butane-diols containing bromine and the relatively high molecular weight oxirane addition products thereof. Melamine and its phosphoric acid derivatives are also known as flame-retardants.

The preparation of foams using amides or esters of divalent or higher valent mononuclear aromatic acids which amides or esters have molecular weights below 400 and which esters or amides contain 2 to 4 hydroxyl groups, optionally in admixture with additional polyols which are free from amide and ester groups and which have an equivalent weight below 200 and a functionality of from 2 to 8 has been disclosed in German Offenlegungsschrift No. 1,745,134. Such amides of aromatic polycarboxylic acids, however, are highly viscous or vitreous masses which are not easily dissolved or dispersed in polyols. At best, such amides can be adequately dispersed only in foam formulations containing water as blowing agent.

The use of bis-($\beta$-hydroxyalkyl)-diamides of aliphatic dicarboxylic acids partly or completely propoxylated on the hydroxyl groups for the production of rigid or semi-rigid polyurethane foams has been described in Austrian Pat. No. 294,429.

The known flame-retardants have various disadvantages in use. Apart from possible harmful physiological effects (especially of $\beta$-halogen esters of phosphorus) another known disadvantage of this class of substances is the frequently insufficient resistance to hydrolysis. This is particularly inconvenient when processing the polyurethane starting components since, as is well known, the addition reaction is catalyzed by compounds containing tertiary amino groups. Since the instability of these flame-retardants is even worse in the alkaline region, formulations of such raw materials can only be stored for a limited time. Sometimes it is found that even formulations which are prepared immediately before processing show signs of changes in activity within a few hours. When such changes occur, they are generally difficult to correct and the parts produced are discarded as rejects since subsequent catalysis is very problematic. In addition to the serious disadvantages of these flame-retardants already described, their plasticizing effect should be mentioned, which results in a considerable lowering of the heat distortion temperature. Added to this is the loss in activity which occurs in the course of time due to the volatility of the compounds used. In motor vehicles, for example, this diffusibility of the substances manifests itself in the repeated formation of deposits on glass surfaces, especially on windshields (fogging).

It was an object of the present invention to provide compounds having a flame-retarding action for use as reactive flame-retardants for polyurethane foams (integral skin or rigid), which flame-retardants should be free from the disadvantages known in the art, namely insufficient solubility or dispersibility in the starting materials, insufficient storage stability of the mixture containing the flame-retardants, softening or plasticizing effects of the flame-retardants, inadequate thermal stability of the foam under load, effects of diffusion and bleeding of the flame-retardant and thus loss in activity, and finally, the release of hydrogen halides in cases of total combustion.

DESCRIPTION OF THE INVENTION

It has been found, completely unexpectedly, that poly-bis-(N,N-hydroxyalkyl)-amides of polybasic aliphatic and cycloaliphatic carboxylic acids corresponding to the following formula $$X\left[\begin{array}{c} O \\ \| \\ -C-N-(A-OH)_2 \end{array}\right]_n$$

which are free from phosphorus and bromine and capable of being incorporated into foam formulations are eminently suitable for the above-noted purposes. In the above formula, n represents an integer from 2 to 6, and preferably from 2 to 4;

X is selected from the group consisting of a bond (when n=2); an alkane group having a valency of n, preferably a $C_1$–$C_{10}$ straight or branched-chain alkane group optionally substituted with hydroxyl groups, and most preferably a $C_1$–$C_4$ alkane group; and a $C_4$–$C_6$-cycloalkane group in which the ring may contain hetero atoms such as O or heteroatomic groups such as N-alkyl, and preferably N—$CH_3$; and A represents a straight or branched chain $C_2$–$C_6$ alkylene group optionally containing OH groups, preferably an ethylene group and/or a 1,2- and/or 1,3-propylene group, and most preferably an ethylene group;

X may be, for example, a bond (n=2) or preferably a $C_1$–$C_4$ alkylene group (n=2). More particular examples of X are

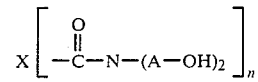 group (n = 2)

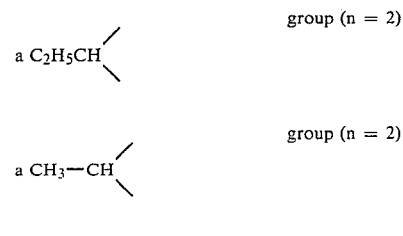

 group (n = 3)

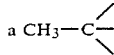 group (n = 3)

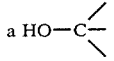 group (n = 3)

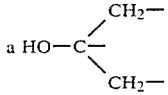 group (n = 3)

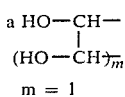 group (n = 2)

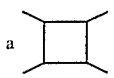 group (n = 4)

 group (n = 4)

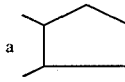 group (n = 4)

These compounds may be synthesized by the method described in European Pat. No. 0,068,281 by reacting polycarboxylic acid alkyl esters corresponding to the formula

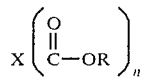

where X and n have the meaning already indicated and R represents an alkyl group (for example a $C_1$–$C_{10}$ and preferably a $C_1$–$C_4$ alkyl group), with dialkanolamines of the formula HN—A-OH)$_2$, where A has the meaning indicated above, at elevated temperatures (50° to 200° C., preferably 70° to 150° C.) and distilling off the hydroxyl component ROH, which is split off in the reaction, to remove it from the reaction mixture. Similar products have also been disclosed in Chem. Abstr., 81, 37268-s (1974).

The present invention thus relates to the use of aliphatic polyhydroxyalkylamide compounds as reactive flame retardants for the production of flame-resistant polyurethane rigid foams, including polyurethane integral skin foams, by the reaction of relatively high molecular weight compounds containing at least 2 isocyanate reactive hydrogen atoms (preferably relatively high molecular weight polyols having molecular weights from 400 to 10,000), with polyisocyanates and optionally chain lengthening agents having molecular weights from 32 to 399, optionally in the presence of catalysts and the usual additives and organic blowing agents, characterized in that flame-retarding agents incorporated therein are the poly-bis-(N,N-hydroxyalkyl)-amide of polybasic aliphatic or cycloaliphatic carboxylic acids according to the invention, corresponding to the formula

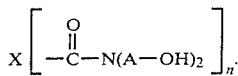

wherein X, A and n have the meanings already described, the said flame-retarding agents being used in quantities of from 11.5 to 50, preferably from 12 to 35 and most preferably from 12 to 25 parts by weight, based on 100 parts by weight of the relatively high molecular weight polyols.

The compounds to be used according to the invention are reactive derivatives of amides of polybasic aliphatic or cycloaliphatic carboxylic acids which are completely hydroxyalkylated on the amide starting material and hence are polyfunctional. Mixtures of such compounds may, of course, also be used.

The following are specific examples:

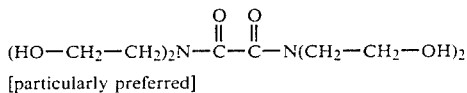
[particularly preferred]

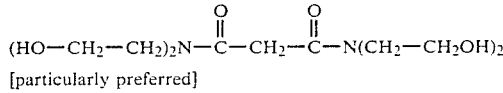
[particularly preferred]

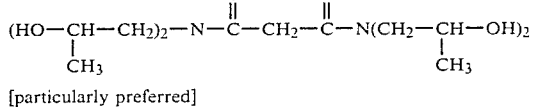
[particularly preferred]

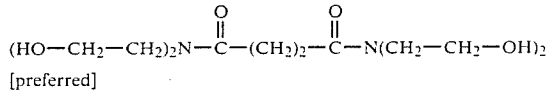
[preferred]

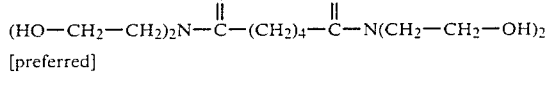
[preferred]

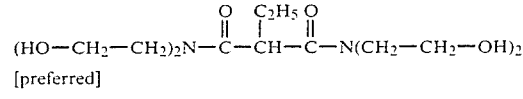
[preferred]

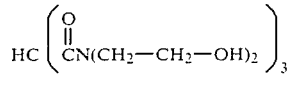

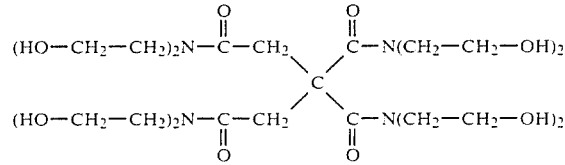

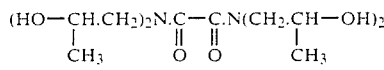

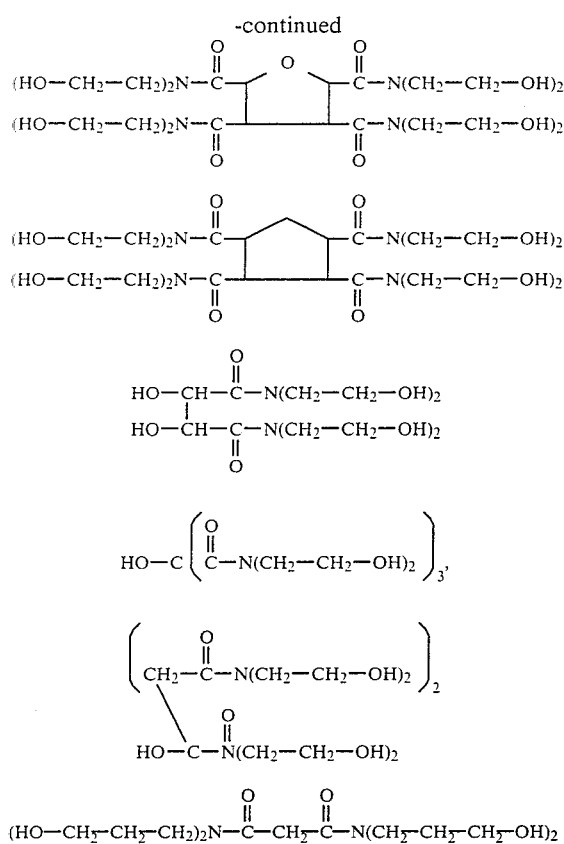

Within the class of compounds according to this invention, the malonic, succinic and adipic acid tetrahydroxyalkylamides are preferred flame-retarding agents, with those amides containing hydroxyethyl groups being particularly preferred.

The effect of these compounds as flame-retarding agents appears to be dependent upon the presence of at least two amide groups. Thus the formamide derivative corresponding to the formula

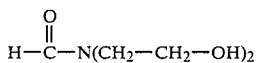

does not show a comparable effect.

The class of compounds defined as aliphatic bis-N,N-hydroxyalkylamides of polybasic aliphatic or cycloaliphatic polycarboxylic acids has already been described as a component of highly elastic polyurethane foams, in which such compounds are used in quantities of up to 10%. According to European Patent 68,281, these compounds have the effect of opening the foam cells when used in highly elastic foams obtained from polyols and preferably modified polyisocyanates with the aid of water as blowing agent. This effect was particularly marked polyisocyanates containing biuret, allophanate or isocyanurate groups were used. Comparison Example 13c) of European Patent No. 68,281 describes the limit on the quantity of polyhydroxyalkylcarbonamides which may be used for the production of highly elastic polyurethane foams for which water is used as blowing agent. When 11 parts of the polyhydroxyalkylamides are used in the formulation for flexible foam using water as blowing agent, cell opening occurs to such a marked extent that a stable cell structure can no longer be obtained. The quantity to be added must therefore always be kept below that at which total collapse might take place.

It has surprisingly been found, however, that it is precisely when polyhydroxyalkylamides are added in large quantities (higher than the maximum permissible for flexible foams) that rigid polyurethane foams may be obtained. The additives do not cause collapse of the cells. The rigid foams according to the invention are obtained most advantageously when organic blowing agents are used instead of water. Furthermore, it has been found that the aliphatic and cycloaliphatic polyhydroxyalkyl carbonamides produce their eminently superior flame-retarding effect when used in these larger quantities compared to those quantities indicated in the above-noted European patent.

The class of compounds according to the invention are preferably used as flame-retarding agents in polyurethane rigid foams and integral skin rigid foams. It has been surprisingly found that when organic blowing agents are used without the addition of water as blowing agent, these foams are able to tolerate the large quantities of polyhydroxyalkylamides required for a flame-retarding effect.

The isocyanates preferably used for the production of the foams according to the invention include modified, liquid isocyanates based on diphenylmethane diisocyanates, which may be prepared by the reaction of diisocyanato-diphenylmethane with small quantities of low molecular weight and/or relatively high molecular weight di- and polyhydroxyl compounds.

The blowing agents used may be halogenated derivatives of lower hydrocarbons, e.g. trichloromonofluoromethane, methylene chloride, 1,1,2-trifluoro1,2,2-trichloroethane, 1,1,2,2-tetrafluoro-1,2-dichloroethane or mixtures thereof.

Whereas polyhydroxyalkyl carboxylic acid amides containing primary OH groups are preferred in integral skin foams of varying degrees of rigidity, carbonamides containing secondary hydroxyl groups are more particularly suitable for use in rigid foams for reasons of formulation compatibility.

The following can be used as foam-forming starting materials for the production of polyurethane rigid and/or integral skin foams containing the flame-retarding agents according to the invention:

1. Compounds containing at least two isocyanate reactive hydrogen atoms, generally with molecular weights of from 400 to 10,000. These may be compounds containing amino groups, thiol groups or carboxyl groups but are preferably compounds containing hydroxyl groups, in particular 2 to 8 hydroxyl groups. Especially preferred are hydroxy compounds having molecular weights of from 800 to 6000, and preferably from 1500 to 4000. Such hydroxy compounds include polyesters, polyethers, polythioethers, polyacetals, polycarbonates or polyester amides having 2 to 4 hydroxy groups, such as the compounds known for the production of both homogeneous and cellular polyurethanes, as described e.g. in German Auslegeschrift No. 2,832,253, pages 11 to 18. Polyethers obtained by the addition of one or more alkylene oxides (ethylene oxide and especially propylene oxide) to divalent or higher valent "starters" such as propylene glycol, glycerol, sorbitol, formose, triethanolamine, ethylenediamine, trimethylolpropane or sucrose are particularly preferred. Also preferred are polyethers containing polyaddition products of diisocyanates and hydrazine and/or diamines and/or glycols or polymers and/or graft polymers, preferably of styrene and acrylonitrile in the form of dispersions or solutions.

2. Compounds containing at least 2 isocyanate reactive hydrogen atoms and having molecular weights from 32 to 399, preferably from 62 to 254, are optionally also used as starting materials. These are also compounds containing hyroxyl groups and/or amino groups and/or thiol groups and/or carboxyl groups and/or hydrazide groups, and preferably hydroxyl groups and/or amino groups, and are used as chain lengthening agents or cross-linking agents. These compounds generally have 2 to 8, preferably 2 to 4 isocyanate reactive hydrogen atoms. Examples are described in German Auslegeschrift No. 2,832,253, pages 19 to 20, and include hydrazine, ethylene glycol, butane-1,4-diol, trimethylolpropane, formitol mixtures and adipic acid dihydrazide. Diols and/or polyols having molecular weights of from 62 to 254 are preferred.

3. Aliphatic, cycloaliphatic, araliphatic, heterocyclic and especially aromatic polyisocyanates such as those described, for example, by W. Siefken in Justus Liebigs Annalen der Chemie, 562, pages 75–136. Examples include those of the formula $Q(NCO)_n$ wherein $n = 2$ to 4, preferably 2, and Q is an aliphatic hydrocarbon group having 2 to 18, preferably 6 to 12, carbon atoms; a cycloaliphatic hydrocarbon group having 4 to 20, preferably 5 to 11 carbon atoms; an aromatic hydrocarbon group having 6 to 20, preferably 6 to 13 carbon atoms; or an araliphatic hydrocarbon group having 8 to 15, preferably 8 to 13 carbon atoms; e.g. the polyisocyanates described in German Auslegeschrift No. 2,832,253, pages 10 to 11. Commercially available polyisocyanates are particularly preferred, e.g. 2,4-and/or 2,6-tolylenediisocyanate and mixtures of these isomers ("TDI"); diphenylmethane diisocyanates (4,4'-and/or 2,4'-and/or 2,2'-isomers); and, polyphenyl-polymethylene polyisocyanates which may be prepared by aniline-formaldehyde condensation followed by phosgenation ("crude MDI"). "Modified polyisocyanates" containing, for example, carbodiimide groups, urethane groups, allophanate groups, isocyanurate groups, urea groups and/or biuret groups are also useful although less preferred. Particularly to be mentioned are those modified polyisocyanates which are derived from 2,4-and/or 2,6-tolylene diisocyanates and especially those derived from 4,4'-and/or 2,4'-diphenylmethane diisocyanate.

4. Auxiliary agents and additives may also be used. Such materials include readily volatile inorganic or organic substances as blowing agents, catalysts (such as tertiary amines or tin-(II) and tin-(IV) compounds), surface active additives, reaction retarders, (e.g. compounds which are acid in reaction such as hydrochloric acid or organic acids or acid halides), cell regulators (such as paraffins, fatty alcohols or dimethylpolysiloxanes), pigments or dyes, stabilizers against ageing, weathering and light, plasticizers, fungistatic and bacteriostatic substances and fillers. These auxiliary agents and additives optionally used are known and have been described, for example, in German Auslegeschrift No. 2,732,292, pages 21 to 24. Other examples of auxiliary agents and additives are described in Kunststoff Handbuch, Volume VII, published by Vieweg and Höchtlen, Carl-Hanser-Verlag, Munich 1966, pages 102–113.

The reactive poly-bis-(N,N-hydroxyalkyl)-amides of at least bifunctional aliphatic and/or cycloaliphatic carboxylic acids according to the invention are normally mixed with the relatively high molecular weight polyol compound in the quantities given. The mixture may also contain the usual additives and auxiliaries. Foam production is carried out in the usual manner, industrially with the aid of mechanical dosing and transport devices. The main field of application is the production of semi-rigid and rigid integral skin foams and rigid foams. The products obtainable may be used wherever flame resistant foams are stipulated or desired, e.g. integral skin foams for transport vehicles and rigid foams for insulating purposes.

The special suitability of polyurethane foams containing the flame-retarding agents according to the invention for transport vehicles is demonstrated by special test methods, viz. MVSS 302, the German Federal Railway Test and the Lufthansa Test. More details are given in the examples which follow. The flame-retarding agents according to this invention are highly efficient when used alone but they may also be used in combination with conventional flame-retarding agents.

Although Example 18 of German Offenlegungsschrift No. 1,745,134 mentions the following representative of aromatic carbonamides:

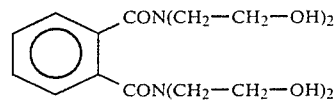

as the sole polyol component for the production of polyurethane rigid foams, this compound is highly viscous and solidifies to a vitreous mass on cooling, so that it is hardly suitable for use in polyurethane foams.

It is therefore all the more suprising that purely aliphatic representatives of the compounds to be used according to the invention produce excellent flame-retarding effects. Additionally such materials are readily useable in a liquid form and are easily dispersed in the polyols without causing any collapse or opening of the foam cells. Moreover, they are effective in substantially smaller quantities than those mentioned in Example 18 of the aforesaid Offenlegungsschrift, as may be seen from Table 1 of the present application.

The reactive flame-retarding agents according to the invention may also be used for production of integral skin foams having certain recoil characteristics such as are required, for example, in steering wheels, side parts, head and neck supports and the external and internal door linings of motor vehicles.

The invention is further illustrated, but is not intended to be limited by the following examples in which all parts and percentages are by weight unless otherwise specified.

EXAMPLES (A) Preparation of the poly-bis-(N,N-hydroxyalkyl)carbonamides

Compound 1

The preparation of Compounds 1 to 12 is carried out in accordance with the description given in German Offenlegungsschrift No. 3,124,885 (see Table 1 hereafter). The preparation of Compound 1 is described below by way of example:

$$(HO-CH_2-CH_2)_2N-\overset{O}{\underset{\|}{C}}-\overset{O}{\underset{\|}{C}}-N(CH_2-CH_2-OH)_2$$

210 g (2 mol) of diethanolamine are added dropwise to 146 g (1 mol) of diethyloxalate. The temperature rises to 90° C. and ethanol is distilled off almost quantitatively. The reaction mixture is treated under vacuum and 264 g (quantitative yield) of tetrahydroxyethyl oxalic acid amide are obtained; viscosity of 80° C.: 1100 mPas, OH number 850.

Compound 13

$$\left(HO-\underset{\underset{CH_3}{|}}{CH}-CH_2\right)_2 N-\overset{O}{\underset{\|}{C}}-CH_2-\overset{O}{\underset{\|}{C}}N\left(CH_2-\underset{\underset{CH_3}{|}}{CH}-OH\right)_2;$$

$C_{15}H_{30}N_2O_6$
(mol. wt. 334)

Prepared according to the method given for Compound 1 from 264 g (2 mol) of dimethylmalonate and 532 g (4 mol) of diisopropanolamine.

TABLE 1

Preparation of the poly-(N,N—bis-hydroxyalkyl)-carbonamides

| Example Number | Compound | OH Number | Example Number Used From German Offenlegungsschrift 3.124,885 |
|---|---|---|---|
| 1 | $(HO-CH_2-CH_2)_2N-\overset{O}{\underset{\|}{C}}-\overset{O}{\underset{\|}{C}}N(CH_2-CH_2-OH)_2$ | 850 | 1 |
| 2 | $(HO-CH_2-CH_2)_2N-\overset{O}{\underset{\|}{C}}-CH_2-\overset{O}{\underset{\|}{C}}N(CH_2-CH_2-OH)_2$ | 800 | 2 |
| 3 | $(HO-CH_2-CH_2)_2N-\overset{O}{\underset{\|}{C}}-(CH_2)_4-\overset{O}{\underset{\|}{C}}N(CH_2-CH_2OH)_2$ | 700 | 3 |
| 4 | $(HO-CH_2-CH_2)_2N-\overset{O}{\underset{\|}{C}}-(CH_2)_{10}-\overset{O}{\underset{\|}{C}}N(CH_2-CH_2-OH)_2$ | 540 | 4 |
| 5 | $HC\left(\overset{O}{\underset{\|}{C}}N(CH_2-CH_2-OH)_2\right)_3$ | 910 | 5 |
| 6 | $[(HO-CH_2-CH_2)_2N-\overset{O}{\underset{\|}{C}}]_2 C[CH_2-\overset{O}{\underset{\|}{C}}-N(CH_2-CH_2-OH)_2]_2$ | 800 | 6 |
| 7 | cyclopentane-tetrakis$\left(\overset{O}{\underset{\|}{C}}-N(CH_2-CH_2-OH)_2\right)_4$ | 750 | 7 |
| 8 | tetrahydrofuran-tetrakis$\left(\overset{O}{\underset{\|}{C}}-N(CH_2-CH_2-OH)_2\right)_4$ | 750 | 8 |
| 9 | $HO-C\begin{cases}\overset{O}{\underset{\|}{C}}-N(CH_2-CH_2-OH)_2 \\ \left(CH_2-\overset{O}{\underset{\|}{C}}-N(CH_2-CH_2-OH)_2\right)_2\end{cases}$ | 860 | 9 |
| 10 | $(HO-CH_2-CH_2)_2-N-\overset{O}{\underset{\|}{C}}-\underset{\underset{OH}{|}}{CH}-\underset{\underset{OH}{|}}{CH}-\overset{O}{\underset{\|}{C}}N(CH_2-CH_2-OH)_2$ | 1040 | 10 |
| 11 | $(HO-\underset{\underset{CH_3}{|}}{CH}-CH_2)_2N-\overset{O}{\underset{\|}{C}}-\overset{O}{\underset{\|}{C}}N(CH_2-\underset{\underset{CH_3}{|}}{CH}-OH)_2$ | 675 | 11 |
| 12 | $(HO-CH_2-CH_2-CH_2)_2N-\overset{O}{\underset{\|}{C}}-\overset{O}{\underset{\|}{C}}-N(CH_2-CH_2-CH_2-OH)_2$ | 670 | 12 |

Yield: 653 g, OH number: 660, calculated: 670 (m=mol).

Compound 14

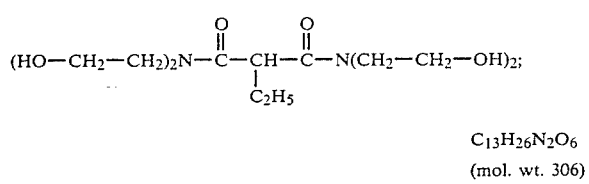

$C_{13}H_{26}N_2O_6$
(mol. wt. 306)

Prepared according to method given for Compound 1 from 160 g (1 m) of ethyl malonic acid dimethylester and 210 g (2 m) of diethanolamine.

Yield: 304 g, OH number: 720, calculated: 732.

Compound 15

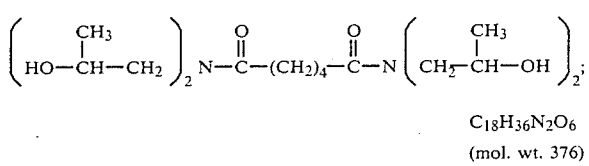

$C_{18}H_{36}N_2O_6$
(mol. wt. 376)

Prepared according to method given for Compound 1 from 261 g (1.5 m) of dimethyladipate and 399 g (3 m) of diisopropanolamine.

Yield: 565 g, quantitative; OH number: 580, calculated: 595. Calculated: C 57.5, H 9.5, N 7.4; Found C 58.1, H 8.5, N 7.4.

(B) Use for the production of integral skin or rigid foams

The following basic formulation was used in all Examples. The flame-retarding components used are indicated in Table 2.

The basic polyol component of the mixture consisted of the following:

100 parts by weight of a trifunctional polyether polyol, OH number 35, prepared by the alkoxylation of trimethylolpropane using propylene oxide, followed by addition of about 15%, based on the total weight of ethylene oxide, 9 parts by weight of ethylene glycol, 0.4 parts by weight of diazabicyclooctane (33% in diisopropanol, "33 LV" product of Houdry/Hüls of Marl, D-4370) and 14 parts by weight of trichlorofluoromethane.

The polyisocyanate component consisted of the quantity shown in the Table of a liquid, substantially bifunctional polyisocyanate (prepared by reacting diphenylmethane series with dipropylene glycol) having an isocyanate content of 28% and a viscosity at 25° C. of 130 mPas.

The basic polyol component was mixed in each case with the given flame-retarding component using the quantities given in Table 2, and the mixture was stirred at room temperature. Slightly cloudy dispersions of the polyhydroxyalkyl polycarboxylic acid amides in the polyols were obtained. These dispersions were adequately stable (up to several months). 100 Parts of the dispersion of the polyhydroxyalkylamides in the basic polyol component were formed using the quantity of isocyanate indicated in Table 2.

TABLE 2

Formulation for the synthesis of PU integral foams modified by incorporation of the polyhydroxyalkyl carbonamides and the fire characteristics of the foams obtained (a)

| Flame retarding agent (FSM) | Quantity of FSM in parts by weight | Basic polyol component in parts by wt. | Quantity of FSM (in parts) to 100 parts of the trifunctional polyether polyol | Quantities of isocyanate in parts by weight | Reactivation with 33 LV |
|---|---|---|---|---|---|
| Tris-(chloro-ethyl)-phosphate (comparison) | 15 | 85 | 14.2 | 43 | — |
| Compound 1 | 15 | 85 | 21.8 | 64 | 0.3 |
| Compound 2 | 15 | 85 | 21.8 | 63 | 0.3 |
| Compound 13 | 15 | 85 | 21.8 | 59 | 0.5 |
| Compound 14 | 15 | 85 | 21.8 | 61 | — |
| Compound 3 | 20 | 80 | 30.8 | 64 | 1.5 |

(b) Fire characteristics

| | | FAR 25853 vertical | | | | Federal German Railway Test DV 899/35 | |
|---|---|---|---|---|---|---|---|
| Flame retarding agent | MVSS 302 classification (mm) | Destroyed length of sample (mm) | After burning time (sec) | Drip burning time (sec) | Test passed | Degree of combustibility | Degree of drop formation |
| Tris-(chloro-ethyl)-phosphate (comparison) | SE | 45 | 32 | 15 | no | B 3 | T 1 |
| Compound 1 | SE | 55 | 5 | 10 | yes | B 3 | T 1 |
| Compound 2 | SE | 45 | 0 | 0 | yes | B 3 | T 1 |
| Compound 13 | SE | 47 | 0 | 0 | yes | B 3 | T 1 |
| Compound 14 | SE | 35 | 0 | 0 | yes | B 3 | T 1 |
| Compound 3 | SE | 40 | 0 | 0 | yes | B 3 | T 1 |

(x) The addition of substantially larger quantities of tris-(chloroethyl)-phosphate (comparison) is not practicable due to its excessive softening effect on the foams.

The test samples were produced manually by mixing the components, using a laboratory stirrer (1450 RPM). The molds for the integral skin foam parts were tempered at 40±2° C. The individual weight was chosen so that the gross density of the molded part was 300 kg/m³. The part was removed from the mold after 5 minutes. If the reaction times deviated unduly from the standard, the foam was re-made by adding additional catalyst as indicated in Table 2.

(C) Test for fire characteristics

Almost all tests to determine the fire characteristics are based on the risk for particular purposes of application. Different test methods are therefore used for different fields of application, leading to results which are comparable only to a limited extent.

Bearing in mind the use purposes of polyurethane foams, three tests were selected from investigating the efficiency of the flame-retarding agents:

(a) Test regulation for the internal fittings of motor vehicles according to DIN 75 200, corresponds to Federal Motor Vehicles Safety Standards (MVSS) 302 of U.S.A.

(b) Combustibility test of the German Federal Railways (c) Fire characteristics of aircraft materials: Federal Aviation Regulations (FAR) 25853 (USA).

The dimensions and number of test samples, the arrangement of the samples, the tests carried out and the requirements to be fulfilled are summarized below:

(a) MVSS 302 (Docket 3-3) (DIN 75 200)
Test Samples: 3 plates 350×100×13 mm Measurement marks at 38, 254, and 312 mm
Arrangement of sample: horizontal
Exposure time to flames: 15 seconds
Determination of burning velocity v between 2nd and 3rd marking.
Requirement: v≦100 mm/min
Classification: SE (self extinguishing), SE/NBR (no burning velocity, sample extinguishes within 60 seconds), BR (will burn, velocity indicated).

(b) German Federal Railway Test DV 899/35
Test samples: 3 plates 300×100×30 mm
Arrangement of samples: vertical
Flame exposure time: 3 min
Determination of degree of combustibility (% of surface burnt)
B 4: non-combustible
B 3: difficultly inflammable, up to 75% of surface burnt
B 2: combustible, 76–90% of surface burnt
B 1: readily combustible, 91 to 100% of surface burnt
Determination of degree of drip formation
T 4: no deformation or softening, no formation of drips
T 3: severe deformation, softening or formation of threads
T 2: non-burning drips formed
T 1: burning drips continue to burn.

(c) Lufthansa test FAR 25853 b
Arrangement of samples: horizontal and vertical
Test sample
horizontal: 3 plates 350×100×13 mm
vertical: 3 plates 350×75×13 mm
Flame exposure time horizontal: 15 sec
vertical: 12 sec
Results required
horizontal: Burning velocity ≦63.4 mm/min
vertical: Length of combustion ≦203 mm
After burning time ≦13 sec
Drip burning time ≦5 sec The Examples demonstrate that the results obtained with the polyhydroxyalkylcarbonamides according to this invention are superior to those obtained with conventional flame-retarding agents, which have the disadvantages described above. This superiority is shown in particular in the criteria for combustibility according to FAR 25853 b, with their exact determination of length of sample destroyed, after-burning time and drip burning time.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the production of flame-resistant polyurethane rigid foams and/or polyurethane integral skin foams by the reaction of relatively high molecular weight compounds containing at least two isocyanate reactive hydrogen atoms with polyisocyanates and optionally chain lengthening agents having molecular weights of from 32 to 399, and optionally in the presence of catalysts and organic blowing agents, the improvement wherein the reaction mixture contains reactive flame-retarding agents, said agents being the poly-bis-(N,N-hydroxyalkyl)-amides of polybasic aliphatic or cycloaliphatic carboxylic acids corresponding to the following formula:

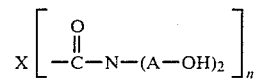

wherein n represents an integer from 2 to 6; X is selected from the group consisting of a bond (when n=2), a n-valent alkane group optionally substituted with hydroxyl groups, and a $C_4$–$C_6$-cycloalkane group in which the ring may contain heteroatoms and A represents a straight chained or branched $C_2$–$C_6$-alkylene group optionally containing a hydroxyl group, said agents being used in quantities of from 11.5 to 50 parts by weight, based on 100 parts by weight of the relatively high molecular weight polyol.

2. The process of claim 1 wherein n represents an integer of from 2 to 4; X is a $C_1$–$C_{10}$ straight or branched chain alkane group, A is selected from the group consisting of ethylene, 1,2-propylene and 1,3-propylene and wherein said quantity is from 12 to 35 parts by weight.

3. The process of claim 1 wherein said agents are used in quantities of from 12 to 25 parts by weight, based on 100 parts by weight of the relatively high molecular weight polyol.

4. The process of claim 1, characterized in that A is an ethylene group and/or or 1,2-propylene group.

5. The process of claim 4, characterized in that A represents an ethylene group.

6. The process of claim 1, characterized in that the agents are oxalic, malonic, succinic or adipic acid tetrahydroxyalkylamides.

7. The process of claim 6, characterized in that the flame-retarding agents are oxalic, malonic, succinic or adipic acid tetrahydroxyethylamides.

8. The process of claim 1, characterized in that said agent corresponds to the following formula:

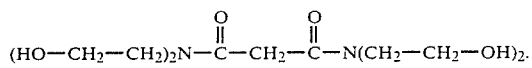
9. The process of claim 1, characterized in that said agent corresponds to the following formula:
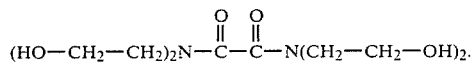
10. The process of claim 1, characterized in that said agent corresponds to the following formula:
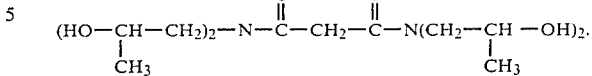
11. The process of claim 1 wherein said foams are produced with the aid of organic blowing agents without the addition of water.
12. A foam produced according to the process of claim 1.
* * * * *